(12) United States Patent
Myrdal et al.

(10) Patent No.: US 10,689,304 B2
(45) Date of Patent: Jun. 23, 2020

(54) FLOWABLE CONCRETE WITH SECONDARY ACCELERATOR

(71) Applicant: Normet International Limited, Hunenberg (CH)

(72) Inventors: Roar Myrdal, Skarnes (NO); Ryan Griffith, Warwick (GB); Kah Fai Lee, Singapore (SG)

(73) Assignee: NORMET INTERNATIONAL LIMITED, Hunenberg (CH)

( * ) Notice: Subject to any disclaimer, the term of this patent is extended or adjusted under 35 U.S.C. 154(b) by 15 days.

(21) Appl. No.: 15/100,221

(22) PCT Filed: Nov. 27, 2014

(86) PCT No.: PCT/EP2014/075848
§ 371 (c)(1),
(2) Date: May 27, 2016

(87) PCT Pub. No.: WO2015/078985
PCT Pub. Date: Jun. 4, 2015

(65) Prior Publication Data
US 2017/0008811 A1    Jan. 12, 2017

(30) Foreign Application Priority Data
Nov. 27, 2013 (GB) .................................. 1320942.4

(51) Int. Cl.
| | | |
|---|---|---|
| *C04B 40/06* | (2006.01) | |
| *C04B 28/02* | (2006.01) | |
| *B05D 1/02* | (2006.01) | |
| *C04B 22/10* | (2006.01) | |
| *C04B 24/00* | (2006.01) | |
| *C04B 24/04* | (2006.01) | |
| *C04B 24/10* | (2006.01) | |
| *C04B 28/08* | (2006.01) | |
| *C04B 103/20* | (2006.01) | |
| *C04B 103/10* | (2006.01) | |
| *C04B 111/00* | (2006.01) | |
| *C04B 111/70* | (2006.01) | |
| *C04B 103/12* | (2006.01) | |
| *C04B 103/22* | (2006.01) | |

(52) U.S. Cl.
CPC ............ *C04B 40/0658* (2013.01); *B05D 1/02* (2013.01); *C04B 22/10* (2013.01); *C04B 24/003* (2013.01); *C04B 24/04* (2013.01); *C04B 24/10* (2013.01); *C04B 28/02* (2013.01); *C04B 28/021* (2013.01); *C04B 28/08* (2013.01); *C04B 2103/10* (2013.01); *C04B 2103/12* (2013.01); *C04B 2103/20* (2013.01); *C04B 2103/22* (2013.01); *C04B 2111/00146* (2013.01); *C04B 2111/00577* (2013.01); *C04B 2111/00724* (2013.01); *C04B 2111/70* (2013.01)

(58) Field of Classification Search
None
See application file for complete search history.

(56) References Cited

U.S. PATENT DOCUMENTS

| | | | |
|---|---|---|---|
| 4,904,503 A | 2/1990 | Hilton et al. | |
| 2003/0106464 A1* | 6/2003 | Yamashita | .......... C04B 24/2647 106/728 |
| 2012/0227630 A1* | 9/2012 | Gray | ...................... C04B 38/08 106/672 |

FOREIGN PATENT DOCUMENTS

| | | |
|---|---|---|
| EP | 0508158 A2 | 10/1992 |
| EP | 0769482 A1 | 4/1997 |
| WO | 0128955 A1 | 4/2001 |

OTHER PUBLICATIONS

International Searching Authority, "Search Report & Written Opinion." issued in connection with International Patent Application No. PCT/EP2014/075848, dated Mar. 23, 2015, 13 pages.
Jennifer A. Grubb, et al., Testing pH of Concrete Need for a standard procedure, Concrete international, Apr. 2007, pp. 76-83.
EFNARC, European Specification for Sprayed Concrete Guidelines for Specifiers and Contractors, 1999, 35 pages.
EFNARC, European Specification for Sprayed Concrete, 1996, 35 pages.

* cited by examiner

*Primary Examiner* — Shamim Ahmed
*Assistant Examiner* — Bradford M Gates
(74) *Attorney, Agent, or Firm* — Nyemaster Goode, P.C.

(57) ABSTRACT

A concrete, mortar or grout formulation comprises two separate components: a concrete admixture comprising: (a) a concrete mixture; (b) alkali carbonate; (c) a retarder; and (d) water, an accelerator mixture comprising: (a) an accelerator component; and (b) water.

20 Claims, No Drawings

FLOWABLE CONCRETE WITH SECONDARY ACCELERATOR

CROSS-REFERENCE TO RELATED APPLICATIONS

This application is the National Stage of International Application No. PCT/EP2014/075848, filed on Nov. 27, 2014, entitled FLOWABLE CONCRETE WITH SECONDARY ACCELERATOR, which claims priority to and the benefit of Great Britain Patent Application No. 1320942.4 filed on Nov. 27, 2013. The entire disclosure of both of the above documents are hereby incorporated by reference in their entirety.

FIELD OF INVENTION

This invention relates to an accelerator for flowable concrete or mortar, particularly but not exclusively for sprayable concrete and flowable grout, particularly backfill grout. This invention also relates to a method of producing flowable concrete.

Fast setting and early strength development are important requirements for sprayable concrete. For example, as applied to a rock surface in a tunnel and for backfill grouts, particularly as used to fill a void created by a tunnel boring machine (TBM).

BACKGROUND

Alkali-free accelerators have been added to the spray nozzle of sprayed concrete equipment immediately before the concrete is applied to a rock substrate. Examples are disclosed in WO99/18045, WO05/028398 and WO08/006410. Aqueous sodium silicate, commonly called water glass, has been added to backfill grout shortly before it is pumped into a void. Alkali carbonates have been used to shorten the setting time and to speed up strength development. However, alkali carbonates decompose when added to weakly acidic alkali free accelerators. Addition of carbonate to silicates causes precipitation of silica gel.

SUMMARY

According to a first aspect of the present invention, a concrete, mortar or grout formulation comprises two separate components:
1. a concrete mixture comprising:
   (a) a concrete composition
   (b) alkali carbonate;
   (c) a retarder; and
   (d) water;
2. a main accelerator mixture comprising:
   (a) an accelerator component; and
   (b) water.

The concrete composition may comprise a typical concrete mix as used for sprayable concrete or shot mortar applications, generally consisting of cement and aggregates, plus fillers and other components such as superplasicisers or other concrete admixtures and water. The sprayable concrete or shot mortar composition may be conveniently referred to as flowable concrete compositions.

The alkali carbonate serves as a secondary accelerator and may be selected from the group consisting of potassium carbonate, sodium carbonate, or mixtures thereof. Hydrated or anhydrous salts may be employed. Use of potassium carbonate is preferred. Lithium carbonate or ammonium carbonate may also be used.

The amount of alkali carbonate by dry weight of the cement component of the concrete composition may be from 0.1% to 2%, preferably 0.2% to 1.5%, more preferably 0.25% to 0.8%, most preferably 0.35% to 0.4% by dry weight.

The carbonate may be added as an aqueous solution, for example, as 5-50% solution.

Percentages, ratios and other proportions used in the specification are by dry weight unless indicated otherwise. Percentages and other proportions are selected from any ranges quoted to total 100%.

The retarder serves to maintain flowability of the concrete or mortar mixture before combination with the main accelerator and application to a substrate. The retarder may be selected from materials used as conventional retarders.

Preferred retarders are selected from:
1. hydroxycarboxylic acids, for example citric acid, gluconic acid, tartaric acid and their salts, for example sodium citrate;
2. sugar compositions, for example, glucose or molasses or corn syrup;
3. phosphonic acids and their salts or phosphate salts, for example, aminotris(methylphosphonic acid) (ATMP), phosphonobutane tricarboxylic acid (PBTC) and aminotris(dimethylphosphonic acid) (ATDP).

Hydroxycarboxylic acids are particularly preferred.

The components of the concrete mixture are preferably selected so that the mixture is not acidic, having a pH greater than about pH 7. A preferred pH is within the range of about pH 7 to about pH 14. A non-acidic mixture is preferred to prevent decomposition of the carbonate.

In preferred embodiments, the ratio of the carbonate to retarder may be in the range of about 4:1 to about 1:1, preferably about 3:1 to about 1.5:1, more preferably about 2.2:1 by weight.

A wide range of accelerator components may be employed in sprayed concrete and grout formulations as the main accelerator. Non-alkaline accelerators containing wholly or partially aluminium sulphate are preferred, for example, Mapequick AF 2000, TamShot 90AF or TamShot 100AF. Non-alkaline accelerators may also contain aluminium hydroxide, carboxylic acids, phosphoric acids, alkanolamines, stabilisers such as sepiolite and water.

Sodium silicate accelerators are preferred for backfill grout applications and may also be used for sprayed concrete applications.

According to a second aspect of the present invention, a method of applying a concrete, mortar or grout composition comprises the steps of:
   providing a mixture comprising alkali carbonate and retarder;
   adding the mixture to a concrete mixture to provide a cementitous composition comprising;
      (a) a concrete mixture;
      (b) alkali carbonate;
      (c) a retarder and
   providing a main accelerator composition comprising:
      (a) an accelerator component; and
      (b) water;
   combining the concrete mixture and accelerator component to initiate curing of the concrete composition;
   immediately applying the concrete composition to a substrate; and
   allowing the concrete composition to cure.

The main accelerator is typically supplied to the spray head using a separate feed.

The present invention confers several advantages. Combination of the alkali carbonate and retarder prevents activation of the carbonate as secondary accelerator. The carbonate and retarder may be combined before addition of the concrete. Alternatively, retarder may be added to the concrete followed by addition of the carbonate.

The applied concrete or grout has an excellent set time and early strength characteristics in comparison to compositions which do not include carbonate in accordance with this invention.

For sprayable concrete an early strength of 1 MPa or higher may be achieved after one hour. This is important for such applications as tunnelling.

DETAILED DESCRIPTION

The composition and method of the present invention facilitate use of blended cements which may contain supplementary materials selected from: fly ash; ground granulated blast furnace slag (GGBS) or silica fume or mixtures thereof. For example, up to 20% fly ash may be employed. In such an application the early strength provided by the cement needs to be increased due to the less reactive supplementary material.

A further advantage is that the secondary accelerator does not need to be supplied to the spray head using a separate feed, so that modification of existing spray equipment is not necessary.

The invention is further described by means of examples, but not in any imitative sense, with reference to the accompanying tables, of which:

Table 1 shows compressive strength values versus time for two sprayed concrete compositions; and Table 2 shows compressive strength values after 2 hours for two TBM backfill grouts.

Table 1: Shows the effect of a secondary accelerator on early age compressive strength of a sprayed concrete measured according to standard test methods used in-situ.

The concrete used was, Norwegian sprayed concrete mix design with 480 kg CEM II per m³ concrete.

The retarder referred to was a standard 'Consistence control admixture' meeting EN 934-5, and is a blend of citric acid and PBTC. The retarder including a secondary accelerator was the same retarder made slightly alkaline using sodium hydroxide and with an additional portion of potassium carbonate.

| | A (without secondary accelerator) | B (with secondary accelerator) |
|---|---|---|
| Concrete mixture incl. superplasticiser | Same composition for A and B | |
| Retarder in the concrete mixture (% by weight of cement) | 0.21 | — |
| Retarder incl. secondary accelerator in the concrete mixture (% by weight of cement) | — | 0.78 |
| Main accelerator added at the nozzle of the sprayer (% by weight of cement) | 8.5 | 8.5 |
| Compressive strength (MPa) at different times after spraying: | | |
| 5 min | 0.25 | 0.71 |
| 10 min | 0.43 | 0.91 |
| 20 min | 0.61 | >1.0 |
| 60 min | 0.85 | >1.0 |
| 90 min | 1.0 | 2.2 |

Table 2: shows the effect of a secondary accelerator on the compressive strength of a two-component TBM backfill grout two hours after mixing component 1 (cementitious mixture) and component 2 (sodium silicate accelerator).

The measurements were performed according to standard test methods used in-situ. The weights referred to are kg per m³ of hardened material. The water content is not shown. The retarder referred to is a standard sugar/gluconate retarder used for backfill grouts, while the retarder incl. a secondary accelerator is the same retarder with an additional portion of potassium carbonate.

The difference in cement and sodium silicate content (the two most costly ingredients in TBM backfill grouts) illustrates the economic gain obtained by the secondary accelerator.

| | A (without secondary accelerator) | B (with secondary accelerator) |
|---|---|---|
| Ordinary Portland cement (kg) | 300 | 280 |
| Bentonite clay (kg) | 30 | 30 |
| Retarder in the concrete mixture (kg) | 4.3 | — |
| Retarder incl. secondary accelerator in the concrete mixture (kg) | — | 4.4 |
| Sodium silicate; main accelerator (kg) | 110 | 83 |
| Compressive strength (MPa) 2 hours after mixing component 1 and 2 | 0.38 | 0.51 |

The invention claimed is:

1. A sprayable concrete, mortar or grout formed from two separate components that when combined by spray application form the concrete, mortar or grout wherein the two separate components are:
   (1) a non-acidic concrete admixture that remains flowable through a spray nozzle comprising a combination of a concrete component; a water-soluble, secondary accelerator chosen from the group consisting of: potassium carbonate, sodium carbonate, lithium carbonate, ammonium carbonate and mixtures thereof; a retarder; and
   (2) a main accelerator mixture comprising: an accelerator component and water.

2. The sprayable concrete, mortar or grout of claim 1, wherein the water-soluble, secondary accelerator is present in an amount of from 0.1 to 2% by dry weight of the non-acidic concrete mixture and wherein the non-acidic concrete admixture further comprises a superplasticizer.

3. The sprayable concrete, mortar or grout of claim 2, wherein the amount of the water-soluble, secondary accelerator is from 0.35% to 0.4% by dry weight of the concrete mixture.

4. The sprayable concrete, mortar or grout of claim 1, wherein the amount of the water-soluble, secondary accelerator is from 0.35 to 0.4% by dry weight of the concrete mixture and wherein the concrete, mortar or grout initially has an alkaline pH.

5. The sprayable concrete, mortar or grout of claim 1, wherein the concrete, mortar or grout initially has an alkaline pH.

6. The sprayable concrete, mortar or grout of claim 5, wherein the retarder comprises a hydroxycarboxylic acid selected from the group consisting of citric acid, gluconic acid, tartaric acid and salts thereof.

7. The sprayable concrete, mortar or grout of claim 1, wherein the retarder comprises a sugar composition and wherein the concrete, mortar or grout initially has an alkaline pH.

8. The sprayable concrete, mortar or grout of claim 7, wherein the sprayable concrete, mortar or grout is a tunnel boring machine backfill grout have a compressive strength of at least 0.51 MPa after two hours.

9. The sprayable concrete, mortar or grout of claim 5, wherein the retarder is a phosphonic acid selected from aminotris(methylphosphonic acid), phosphonobutane tricarboxylic acid and aminotris (dimethylphosphonic acid).

10. The sprayable concrete, mortar or grout of claim 1, wherein the ratio of carbonate to retarder is in a range of 5:1 to 3:1 by dry weight and the sprayable concrete, mortar, or grout is sprayable concrete and the sprayable concrete has a compressive strength of 1 MPa or higher after one hour.

11. A method of applying a concrete composition to a rock surface in a tunnel or a surface of a void created by a tunnel boring machine comprising the steps of:
   adding a liquid retarder to the concrete mixture and mixing;
   adding a water soluble, secondary accelerator selected from the group consisting of: potassium carbonate; sodium carbonate; lithium carbonate; ammonium carbonate; and mixtures thereof and mixing to provide cementitious composition comprising:
   (a) a concrete admixture;
   (b) the water soluble, secondary accelerator;
   (c) a retarder; and
   (d) water;
   providing a liquid accelerator composition comprising:
   (a) a main accelerator; and
   (b) water;
   combining the cementitious composition and the liquid accelerator composition via two separate feeds to a spray head to apply to the rock surface a concrete composition formed from the combination of the cementitious composition and the liquid accelerator composition; and
   allowing the concrete composition to cure on the rock surface or the surface of the void created by the tunnel boring machine and form a cured concrete.

12. The method of applying a concrete composition of claim 11, wherein the amount of the water soluble, secondary accelerator is from 0.1 to 2% by dry weight of the concrete mixture and wherein the cured concrete has an alkaline pH.

13. The method of applying a concrete composition of claim 12, wherein the amount of the water soluble, secondary accelerator is from 0.35 to 0.4% by weight of the concrete mixture.

14. The method of applying a concrete composition of claim 13, wherein the retarder is selected from the group consisting of hydroxycarboxylic acids and salts thereof and the main accelerator is a sodium silicate.

15. The method of applying a concrete composition of claim 14, wherein the hydroxycarboxylic acid is selected from the group consisting of citric acid, gluconic acid, tartaric acid and salts thereof.

16. The method of applying a concrete composition of claim 13, wherein the retarder comprises a sugar composition and the main accelerator comprises a sodium silicate.

17. The method of applying a concrete composition of claim 16, wherein the retarder comprises a sugar composition selected from the group consisting of: glucose; molasses; corn syrup; and mixtures thereof; and
   wherein the concrete composition has a strength of 1 MPa or higher after curing for one hour.

18. The method of applying a concrete composition of claim 13, wherein the retarder is selected from the group consisting of phosphonic acids and salts thereof and the water soluble, secondary accelerator is an accelerator containing aluminum sulfate.

19. The method of applying a concrete composition of claim 18, wherein the retarder is selected from aminotris (methylphosphonic acid), phosphonobutane tricarboxylic acid and aminotris (dimethylphosphonic acid).

20. The method of applying a concrete composition of claim 19, wherein the ratio of water soluble, secondary accelerator to retarder is in the range of 5:1 to 3:1 by dry weight; and
   wherein the concrete composition has a strength of 1 MPa or higher after curing for one hour.

* * * * *